(12) United States Patent
Deshmukh et al.

(10) Patent No.: US 10,331,224 B2
(45) Date of Patent: Jun. 25, 2019

(54) INDIAN LANGUAGE KEYPAD

(71) Applicant: OSLABS PTE. LTD., Singapore (SG)

(72) Inventors: Rakesh Deshmukh, Mumbai (IN);
Sudhir Bangarambandi, Mumbai (IN);
Akash Dongre, Mumbai (IN);
Hariharan Padmanabhan, Mumbai (IN)

(73) Assignee: OSLABS PTE. LTD., Singapore (SG)

( * ) Notice: Subject to any disclaimer, the term of this patent is extended or adjusted under 35 U.S.C. 154(b) by 441 days.

(21) Appl. No.: 15/028,013

(22) PCT Filed: Sep. 29, 2014

(86) PCT No.: PCT/IN2014/000624
§ 371 (c)(1),
(2) Date: Apr. 7, 2016

(87) PCT Pub. No.: WO2015/052724
PCT Pub. Date: Apr. 16, 2015

(65) Prior Publication Data
US 2016/0246385 A1    Aug. 25, 2016

(30) Foreign Application Priority Data
Oct. 7, 2013   (IN) .......................... 3175/MUM/2013

(51) Int. Cl.
| | |
|---|---|
| *G06F 3/01* | (2006.01) |
| *G06F 3/0488* | (2013.01) |
| *G06F 3/0482* | (2013.01) |
| *G06F 17/27* | (2006.01) |

(52) U.S. Cl.
CPC ............ *G06F 3/018* (2013.01); *G06F 3/0482* (2013.01); *G06F 3/04886* (2013.01); *G06F 17/274* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,809,725 | B1 * | 10/2004 | Zhang ..................... | G06F 3/018 345/171 |
| 7,721,222 | B1 * | 5/2010 | Shaik ...................... | G06F 3/018 345/156 |
| 2003/0119551 | A1 * | 6/2003 | Laukkanen ........... | G06F 3/0236 455/556.1 |

(Continued)

*Primary Examiner* — Hien L Duong
(74) *Attorney, Agent, or Firm* — Barry Choobin; Patent 360 LLC (57) ABSTRACT

A computer implemented system for generating vowel-signs based keypad having predictive capabilities, and a method thereof, have been disclosed. The keypad configured to enable a user to input alphabets in at least one Indian language, and is displayed on a user interface. The keypad layout includes alphabets corresponding to an Indian language, frequently used vowel-signs, and frequently used alphabets, being represented in the form of selectable keys. The user interface cooperates with a processor that processes the alphabet(s) input by the user, and subsequently triggers a display of vowel-signs, consonants, and half consonants on the user interface, in the event that the user inputs a consonant(s).

12 Claims, 3 Drawing Sheets

(56) References Cited

U.S. PATENT DOCUMENTS

| | | | | |
|---|---|---|---|---|
| 2003/0122785 | A1* | 7/2003 | Jayachandra | G06F 3/018 345/171 |
| 2004/0004558 | A1* | 1/2004 | Fux | G06F 3/018 341/22 |
| 2004/0066405 | A1* | 4/2004 | Wessler | G06F 1/1626 715/764 |
| 2006/0193468 | A1* | 8/2006 | Ahn | G06F 3/0233 379/433.07 |
| 2007/0156394 | A1* | 7/2007 | Banerjee | G06F 3/018 704/10 |
| 2007/0174771 | A1* | 7/2007 | Mistry | G06F 3/018 715/703 |
| 2008/0025613 | A1* | 1/2008 | Kumar | G06F 3/03545 382/189 |
| 2008/0120540 | A1* | 5/2008 | Borgaonkar | G06F 3/018 715/268 |
| 2009/0037837 | A1* | 2/2009 | Raghunath | G06F 3/0237 715/773 |
| 2009/0262082 | A1* | 10/2009 | Park | G06F 3/018 345/171 |
| 2011/0054882 | A1* | 3/2011 | Bhalerao | G06F 17/2705 704/9 |
| 2012/0056815 | A1* | 3/2012 | Mehra | G06F 3/018 345/169 |
| 2012/0293529 | A1* | 11/2012 | Che | G06F 3/0236 345/589 |
| 2013/0339895 | A1* | 12/2013 | Hirshberg | G06F 3/04886 715/773 |
| 2014/0043239 | A1* | 2/2014 | Agrawal | G06F 3/04886 345/169 |
| 2015/0067575 | A1* | 3/2015 | Pani | G06F 3/04886 715/773 |

* cited by examiner

INDIAN LANGUAGE KEYPAD

CROSS REFERENCE TO RELATED APPLICATIONS

Benefit is claimed under 35 U.S.C. 119(a)-(d) to Foreign application Serial No. 3175/MUM/2013 filed in India entitled "METHOD AND SYSTEM FOR VOWEL-SIGNS BASED KEYBOARD WITH PREDICTION FOR COMMUNICATION DEVICES", on Oct. 7, 2013, which is herein incorporated in its entirety by reference for all purposes.

BACKGROUND

Technical Field

The present disclosure relates to systems and methods that provide for alphabets to be input onto a handheld electronic device. Particularly, the present disclosure relates to systems and methods that provide for alphabets to be input in a plurality of Indian languages.

Description of Related Art

With the advent of smart phones and with substantial improvements in the technology necessary for telecommunication, there has been a substantial increase in the number of mobile phone users. Smart phone offer SMS (Short Messaging Service) in addition to standard voice communication facilities.

Further, in order to make use of the SMS, a mobile phone user (referred to as 'user' hereinafter) also needs to make use of a keypad which provides for the alphabets (characters) to be input. Since mobile phones are used by a multitude of users including those who read and write English, and those who don't, the operating systems of mobile phones were tweaked to include local language based keypads as well. However, the local language based keypads were mere extensions of the 'QWERTY' keypad, and such keypads are not tailor made to suit any of the Indian languages.

Mere extensions of QWERTY keypads are unsuccessful in providing a seamless typing experience, given the complex nature of Indian languages. Most of the Indian languages are complex in the sense that they contain alphabets which are a combination of vowels and consonants (also referred to as 'vowel signs', in the context of Indian languages). Typically QWERTY keypads are designed and equipped to display a plurality of vowels and a plurality of consonants. However, when a QWERTY keypad layout is altered with, in order to display Indian language alphabets, the layout does not turn out to be user-friendly and convenient since a QWERTY keypad never accounted for alphabets that are a combination of vowels and consonants.

Further, some of the Indian languages incorporate half-consonants. The phenomenon of half-consonants is absent in English, and an Indian language keypad derived from the QWERTY keypad cannot be expected to seamlessly incorporate half consonants. Further, most of the Indian languages also provide for vowel signs to be combined with consonants, and since English as a language does not allow alphabets to be combined with one another, providing such a feature on a (Indian language) keypad which is derived from the QWERTY keypad renders the (Indian Language) keypad complicated.

Further, an Indian language keypad which is derived directly/indirectly from the QWERTY keypad does not display all the vowels, consonants and vowel signs at appropriate and yet convenient positions, for the user to select the same.

Several Patent Documents including U.S. Pat. No. 5,387,042 to Brown, U.S. Pat. No. 5,378,068 to Hua and U.S. Pat. No. 5,212,638 to Bernath envisaged keypad layouts winch were created as a result of physical assignment or addition of different language characters to particular keys, and used various means to convert the keypad layout from QWERTY format to alternative formats. One of the disadvantages of aforementioned keypads is that they are not suitable in terms of aesthetics as well as ease of use, given the fact that they are dealing with vowel signs, half consonants which were not a part of the English language which formed the basis for the QWERTY keypad layout. Further, the existing Indian Language keypads did not incorporate predictive capabilities, which would have have enabled them to predict an Indian language word, subsequent to receiving a partial input from the user.

Additionally, providing for text to be input via an electronic device, in languages based on vowel-signs presents a multitude of challenges as for as usability is concerned. A part of the challenge arises due to the structure of the Indic scripts, which are derived from the Brahmi script. Mechanisms to input text in Indian languages have been used, but none of them have been user friendly considering the fact that the words of Indian languages are constructed using consonants, consonant clusters and vowels, vowels with diacritics, vowel-signs and half consonants.

OBJECTS

An object of the present disclosure is to provide a keypad layout catering exclusively to Indian Languages.

Yet another object of the present disclosure is to provide a keypad layout that seamlessly incorporates vowels, consonants, vowel-signs and half-consonants.

Still a further object of the present disclosure is to provide a keypad embedded with predictive capabilities, and enabling the keypad to predict the word(s) based on the character inputs provided by users.

One more object of the present disclosure is to provide a keypad customized for Indic languages.

Yet another object of the present disclosure is to provide a keypad embedded with auto-correction capabilities.

SUMMARY

The present disclosure envisages a computer implemented system for generating vowel-signs based keypad having predictive capabilities. The keypad enables a user to input alphabets in at least one Indian language. The system comprises a user interface that displays a keypad layout, comprising alphabets corresponding to an Indian language, and frequently used vowel-signs, and frequently used alphabets.

The system further includes a processor that processes the alphabet(s) input by the user, and triggers a display of vowel-signs, consonants and half consonants on the user interface, in the event that the user inputs a consonant. The processor further processes the alphabet(s) input by the user, and trigger a display of words that comprise the alphabet(s) input by the user.

The processor is further configured to forecast to plurality of vowel-signs applicable to consonant(s) input by the user, and also generate a list comprising the vowel-signs, the vowel-signs being listed in the decreasing order of priority, wherein the priority is calculated by the processor based on the probability that a particular vowel-sign can be attached to a particular consonant.

In accordance with the present disclosure, the processor is further configured to list the vowel-signs in the decreasing order of priority, herein the priority is calculated based on the usage history of combination of vowel-signs and consonants.

In accordance with the present disclosure, the processor is further configured to list the vowel-signs in the decreasing order of priority, wherein the priority is calculated by the processor based on the grammatical rules prescribed by the corresponding Indian language.

In accordance with the present disclosure, the processor is further configured to forecast a plurality of plausible words, subsequent to and based on an alphabet input by the user, the processor further configured to include frequently used combinations of vowels, consonants, vowel-signs and half consonants in the forecast.

In accordance with the present disclosure, the processor is further configured to forecast a plurality of plausible words, subsequent to and based on an alphabet input by the user, the processor further configured to include combinations of vowels, consonants, vowel-signs and half consonants based on the grammatical rules prescribed by the corresponding Indian language.

In accordance with the present disclosure, the processor is further configured to process the alphabet(s) and the sequence thereof input by the user, the processor still further configured to compare the sequence input by the user with a pre-stored set of words, the processor still further configured to determine whether the sequence entered by the user is grammatically correct, the processor still further configured to search for at least one word from the pre-stored set of words that matches the sequence, and replace the sequence with the matched word, only in the event that the sequence was determined to be grammatically incorrect.

In accordance with the present disclosure, the processor is configured to prioritize the display of frequently used vowel-signs on the user interface, the processor still further configured to prioritize the display of frequently used plausible words, on the user interface.

The present disclosure envisages a computer implemented method for generating a vowel-signs based keypad having predictive capabilities. The method, in accordance with the present disclosure comprises the following steps: displaying a keypad layout on a user interface; representing alphabets corresponding to an Indian language, and frequently used vowel-signs, frequently used alphabets as selectable keys on the keypad layout; processing the alphabet(s) input by the user, triggering a display of vowel-signs, consonants and half consonants on the user interface, in the event that the user inputs a consonant; and processing the alphabet(s) input by the user, and triggering a display of words that comprise the alphabet(s) input by the user.

In accordance with the present disclosure, the step of processing the alphabet(s) input by the user, further includes the following steps: forecasting a plurality of vowel-signs applicable to a consonant input by the user; and generating a list comprising the vowel-signs, and listing the vowel-signs in the decreasing order of priority, wherein the priority is calculated by a processor based on the probability that a particular vowel-sign can be attached to a consonant.

In accordance with the present disclosure, the step of generating a list comprising the vowel-signs and listing the vowel-signs in the decreasing order of priority, further includes the step of calculating the priority using a processor, and based on the usage history of combination of vowel-signs and consonants.

In accordance With the present disclosure, the step of generating a list comprising the vowel-signs, and listing the vowel-signs in the decreasing order of priority, further includes the step of calculating the priority using a processor, and based on the grammatical rules prescribed by the corresponding Indian language.

In accordance with the present disclosure, the step of processing the alphabet(s) input by the user, further includes the following steps: forecasting a plurality of plausible word, subsequent to and based on an alphabet input by the user; and incorporating frequently used combinations of vowels, consonants, vowel-signs and half consonants into the forecast.

In accordance with the present disclosure, the step of including frequently used combinations of vowels, consonants, vowel-signs and half consonants in the forecast further includes the step of incorporating combinations of vowels, consonants, vowel-signs and half consonants based on the grammatical rules prescribed by the corresponding Indian language.

In accordance with the present disclosure, the step of processing the alphabet(s) input by the user, further includes the following steps: processing the alphabet(s) and the sequence thereof input by the user; comparing the sequence input by the user with a pre-stored set of words; determining whether the sequence entered by the user is grammatically correct; and searching for at least one word from the pre-stored set of words that matches the sequence, and replacing the sequence with the matched word, only in the event that the sequence was determined to be grammatically incorrect.

The present disclosure envisages a computer program product having computer readable instructions stored thereupon, the computer readable instructions, when executed b a processor, cause the computer enabled device to: display a keypad layout on a user interface represent alphabets corresponding to an Indian language, and frequently used vowel-signs, frequently used alphabets as selectable keys on the keypad layout; process the alphabet(s) input by the user; trigger a display of vowel-signs, consonant and half consonants on the user interface, in the event that the user inputs a consonant; process the alphabet(s) input by the user, and trigger a display of words that comprise the alphabet(s) input by the user; forecast a plurality of vowel-signs applicable to a consonant input by the user; generate a list comprising the vowel-signs, and, listing the vowel-signs in the decreasing order of priority, wherein the priority is calculated by the processor based on the probability that a particular vowel-sign can be attached to a particular consonant; list the vowel-signs in the decreasing order of priority, wherein the priority is calculated by the processor based on the usage history of combination of vowel-signs and consonants; list the vowel-signs in the decreasing order of priority, wherein the priority is calculated by the processor based on the grammatical rules prescribed by the corresponding Indian language; forecast a plurality of plausible words, subsequent to and based on an alphabet input by the user; incorporate frequently used combinations of vowels, consonants, vowel-signs and half consonants into the forecast; and incorporate combinations of vowels, consonants, vowel-signs and half consonants based on the grammatical rules prescribed by the corresponding Indian language.

In accordance with the present disclosure, the computer readable instructions, when executed by the processor, are further configured to: process the alphabet(s) and the sequence thereof input by the user; compare the sequence input by the user with a pre-stored set of words; determine whether the sequence entered by the user is grammatically correct search for at least one word from the pre-stored set of words that matches the sequence, and replace the sequence with the matched word, only in the event that the sequence was determined to be grammatically incorrect; prioritize the display of frequently used vowel-signs on the user interface; and prioritize the display of frequently used plausible words, on the user interface.

BRIEF DESCRIPTION OF THE ACCOMPANYING DRAWINGS

These and the other features, aspects, and advantages of the present invention will become apparent when the following detailed description is analyzed in conjunction with the accompanying drawings in which like characters represent like parts throughout, and wherein.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The present disclosure envisages a keypad for electronic devices, preferably for mobile devices. The keypad envisaged by the present disclosure provides for fast and easy typing of alphabets on mobile devices. Further, the keypad envisaged by the present, disclosure provides for prediction of vowel-signs, based on the vowels/consonants input by the user. Further, the keypad envisaged by the present disclosure also predicts the words based on the alphabet(s) keyed-in by the user. Additionally, the keypad enables the user to use any language having vowel-signs based script, such as Hindi (Devanagri script), Gujarathi (Bramhi Derived Scripts), Oriya, Punjabi (Gurmukhi script); Bengali, Assamese, Telugu, Tamil, Kannada, Malayalam (India); Sinhala (Sri Lanka); Nepali (script derived from Devanagari script).

The keypad envisaged by the present disclosure comprises predicts commonly used letters with possible vowel-signs for a particular language, thereby enabling the user to type-in combinations of consonants, vowels and vowel-signs with increased accuracy and relative ease. The keypad layout displays inter-alia, commonly used vowel-signs, and while typing the user is provided with an option to choose the vowel-signs applicable to the input character. Additionally, the system envisaged by the present disclosure provides a simple and easy to understand keypad layout for languages having vowel-signs based scripts. The key assignments being spatially grouped on the keypad in accordance with the manner the vowels and consonants are formulated for respective Indian languages.

In accordance with an exemplary embodiment of the present disclosure, the keys present on the keypad correspond to frequently used alphabets and on and other alphabets and vowel-signs are available, on a secondary layout of the keypad. In accordance with the present disclosure, when the user type a character, which is a complete consonant, the system generates the vowel-sign applied on the consonant to provide the user with option to select particular conjugate letter for further typing the word.

In accordance with the present disclosure, the prediction of words and vowel-signs is followed by auto adjustment for the ordering of vowel-signs as well word suggestions, thereby enabling users to key-in vowel-signs easily and select a preferred word without going through the cumbersome process of typing all the characters of the word. Additionally, suggestibility of words provides the user an option to type faster. Further, the keypad envisaged by the present disclosure also provides an auto correction mechanism for correcting common mistakes. The auto correction mechanism provides an option to the user to have vowel-signs at correct place, the auto correction also provides an option to correct the vowel-signs, which has been inserted wrongly.

Figure 1:
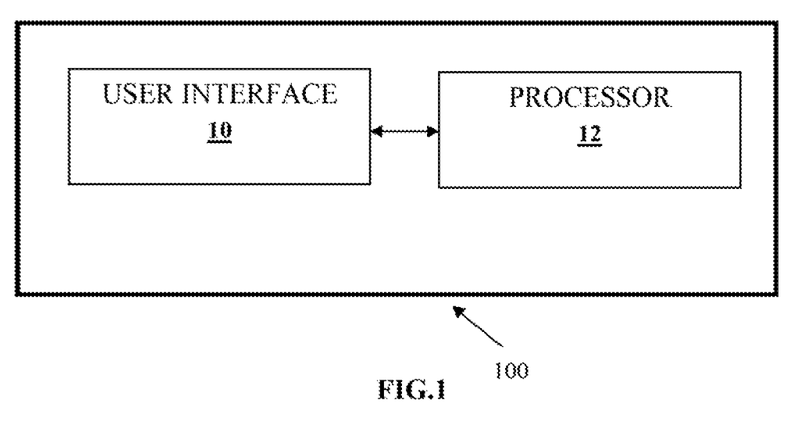
FIG. 1 is a block diagram illustrating the functional components of the system for generating vowel-signs based keypad having predictive capabilities.

Referring to the accompanying drawings, and specifically to FIG. 1, there is shown a block diagram illustrating a system 100 for generating vowel-signs based keypad layout. In accordance with the present disclosure, the system 100 includes a user interface 10 configured to display a keypad layout.

The keypad layout displayed by the user interface 10 include alphabets corresponding to an Indian language. The Indian language includes but is not restricted to Hindi, Bengali, Gujarati, Assamese, Oriya, Telugu, Tamil, Sinhala, Malayalam and kannada. It is to be appreciated that the list of languages, provided herein is not exhaustive and the user interface 10 envisaged by the present disclosure can be utilized to display alphabets corresponding to any Indian language that includes vowel-sips as a part of its script.

Figure 3:
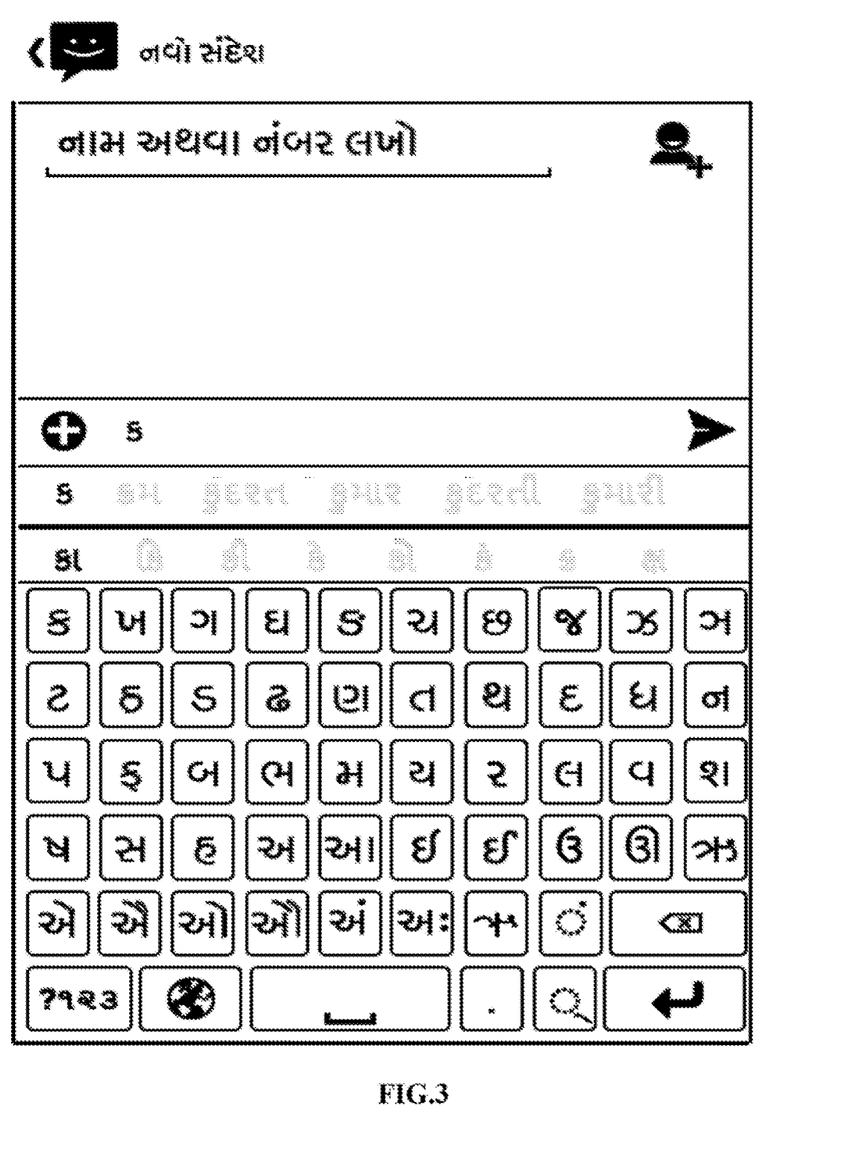
FIG. 3 illustrates an example view of the user interface in accordance with the present disclosure.

In accordance with the present disclosure, the user interface 10 displays a keypad layout comprising vowels, consonants, and vowel-signs; preferably frequently used vowel-signs (as shown in FIG. 3). The user interface 10 further represents the vowels, consonants, and vowel-signs in the form of selectable keys and enables the user input either a vowel or a consonant or an vowel sign, by selecting the corresponding key.

The user interface 10 cooperates with a processor 12 which processes the alphabets selected by the user. The processor 12, at first determines whether the user has input a vowel or a consonant. In the event that the processor 12 determines that the user has selected a consonant as input, the processor 12 further triggers a display of the vowel-signs, and half consonants that can to be attached to the consonant previously input by the user. Further, the processor 12 is configured to include consonants and vowels, preferably frequently used consonants and vowels subsequent to the user selecting a consonant as input. Further, the processor processes the alphabet(s) input by the user, and subsequently triggers a display of words that comprise the alphabet(s) input by the user.

In accordance with an exemplary embodiment of the present disclosure, the user interface 10 is configured to display the vowels and consonants in a first (keypad) layout, and display the vowel-signs that can be attached to a consonant previously typed by the user, on a second (keypad) layout, with the first layout and the second layout being displayed alternately on the user interface. Further, the first layout and the second layout can be optionally toggled using a predetermined toggle key. Alternatively, the user interface 10 can be configured to display the vowels and consonants as selectable keys in the first layout, and display the vowel-signs as non-selectable keys on the first layout. Further, the user interface 10 can be configured to transform the 'non-selectable' vowel-sign keys into 'selectable' keys, on receiving a signal from the processor 12 indicating that the user has selected a consonant key on the user interface 10. In accordance with the present disclosure, the user interface 10 is further configured to display a half-consonant in response to the user selecting a consonant key on the user interface. The half consonant can be initially displayed as a non-selectable key on the first layout, and transformed into a selectable key subsequent to the input of a consonant.

The processor 12, in accordance with the present disclosure, the processor 12 is further configured to forecast a plurality of vowel-signs that can be attached to a consonant input by the user. The processor 12 further creates a list of forecasted vowel-signs that can be attached to the consonant typed by the user, and subsequently orders the vowel-signs in accordance with the decreasing order of the priority.

In accordance with the present disclosure, the processor 12 is configured to determine the priority of each of the vowel-signs included in the list, based on, including but not restricted to the semantics of the corresponding Indian language, the frequency of usage of said combination of vowel-sign and the input consonant. Further, while determining the frequency of usage (usage history) of combination (of the vowel-sign and the consonant), the processor 12 takes into consideration the frequency of usage of all the users having used the system 100, as well as the current user of the system 100.

In accordance with the present disclosure, the processor is further configured to forecast a plurality of plausible words corresponding to an alphabet or a series of alphabets input by the user. The processor 12, in accordance with the present disclosure, processes the alphabet(s) input by the user and the sequence thereof, and subsequently compares the sequence with a pre-stored list of words, and identifies those words that closely match the sequence (of alphabets) input by the user. Subsequent to the identification, those words are added to a list of plausible words. Further, the processor 12 identifies word(s) that comprise the alphabet(s) input by the user, and incorporates those words into the list of plausible words.

Subsequently, the processor cooperates with the user interface to display the identified (plausible) words as recommendations, for the user. Further, the processor 12 enables the user to select any of the displayed plausible words, as the input and subsequently replaces the alphabets input by the user, with the word selected by the user.

In accordance with the present disclosure, the processor 12 is configured to display the identified plausible words in a predetermined order, as recommendations. The processor 12 determines the order of display based on at least the frequency of usage of said words by all the users of the system 100, and the frequency of usage of said words by the current user of the system 100. Further, the plausible words identified by the processor 12 include vowels, consonants, half consonants, vowel-signs and combinations thereof.

In accordance with the present disclosure, the processor 12 is further configured to process the alphabet(s) and the sequence thereof input by the user, and compare the sequence input by the user with the pre-stored set of words. The processor 12 further determines, based on the comparison, whether the sequence of alphabets input by the user are in accordance with the semantics prescribed by the corresponding Indian language. In the event that the words input by the user are not in accordance with the semantics of the corresponding Indian language, owing to the presence of an inappropriate alphabet, the processor 12 searches for at least one word, from the pre-stored set of words, that closely matches the sequence entered by the user in terms of the syntax, and subsequently replaces the sequence (input by the user) with the closely matching term automatically and dynamically.

Figure 2:
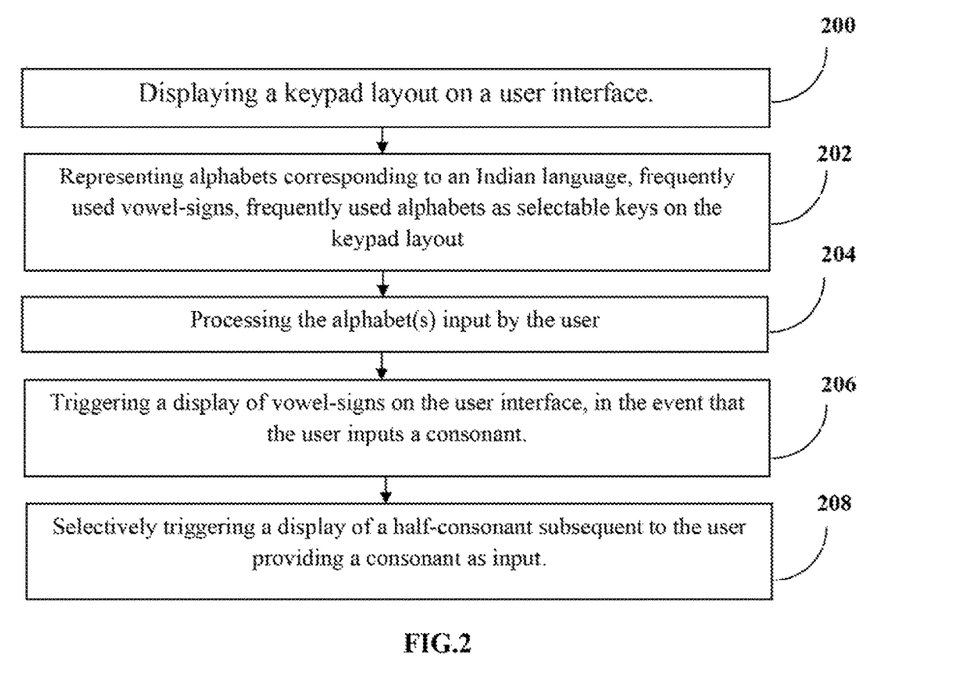
FIG. 2 is a flow chart illustrating the steps involved in the computer implemented method for generating vowel-signs based keypad having predictive capabilities.

Referring to FIG. 2, there is shown a flowchart illustrating the steps involved in the method for generating vowel-signs based keypad having predictive capabilities. The method, in accordance with the present disclosure comprises the following computer implemented steps:

displaying a keypad layout on a user interface (200);
representing alphabets corresponding to all Indian language, and
frequently used vowel-signs, frequently used alphabets as selectable keys on the keypad layout (202);
processing the alphabet(s) input by the user (204);
triggering a display of vowel-signs, consonants and half consonants on the user interface, in the event that the user inputs a consonant (206); and
processing the alphabet(s) input by the user, and triggering a display of words that comprise the alphabet(s) input by the user (208).

In accordance with the present disclosure, the step of processing the alphabet(s) input by the user, further includes the following steps: forecasting a plurality of vowel-signs applicable to a consonant input by the user; and generating a list comprising said vowel-signs, and listing said vowel-signs in the decreasing order of priority, wherein the priority is calculated by a processor based on the probability that a particular vowel-sign can be attached to a consonant.

In accordance with the present disclosure, the step of generating a list comprising said vowel-signs, and listing said vowel-signs in the decreasing order of priority, further includes the step of calculating the priority using a processor, and based on the usage history of combination of vowel-signs and consonant.

In accordance with the present disclosure, the step of generating a list comprising said vowel-signs, and listing said vowel-signs in the decreasing order of priority, further includes the step of listing said vowel-signs in the decreasing order of priority, wherein the priority is calculated by said processor based on the grammatical rules prescribed by the corresponding Indian language.

In accordance with the present disclosure, the step of processing the alphabet(s) input by the user, further includes the following steps: forecasting a plurality of plausible word, subsequent to and based on an alphabet input by the user; and incorporating frequently used combinations of vowels, consonants, vowel-signs and half consonants into said forecast.

In accordance with the present disclosure, the step of including frequently used combinations of vowels, consonants, vowel-signs and half consonants in said forecast further includes the step of incorporating combinations of vowels, consonants, vowel-signs and half consonants based on the grammatical rules prescribed by the corresponding Indian language.

In accordance with the present disclosure, the step of processing the alphabet(s) input by the user, further includes the following steps:

processing the alphabet(s) and the sequence thereof input by the user;

comparing the sequence input by the user with a pre-stored set of words;

determining whether the sequence entered by the user is grammatically correct; and searching for at least one word from the pre-stored set of words that matches the sequence, and replacing said sequence with the matched word, only in the event that the sequence was determined to be grammatically incorrect.

Further, the present disclosure envisages a computer program product having computer readable instructions stored thereupon, the computer readable instructions, when executed by a processor, cause the computer enabled device to: display a keypad layout on a user interface; represent alphabets corresponding to an Indian language, and frequently used vowel-signs, frequently used alphabets as selectable keys on the keypad layout; process the alphabet input by the user; trigger a display of vowel-signs, consonants and half-consonants on the user interface, in the event that the user inputs a consonant; process the alphabet(s) input by the user, and trigger a display of words that comprise the alphabet(s) input by the user; forecast a plurality of vowel-signs applicable to a consonant input by the user; generate a list comprising the vowel-signs, and listing the vowel-signs in the decreasing order of priority, wherein the priority is calculated by the processor based on the probability that a particular vowel-sign can be attached to a particular consonant; list the vowel-signs in the decreasing order of priority, wherein the priority is calculated by the processor based on the usage history of combination of vowel-signs and consonants; list the vowel-signs in the decreasing order of priority, wherein the priority is calculated by the processor based on the grammatical rules prescribed by the corresponding Indian language; forecast a plurality of plausible words, subsequent to and based on an alphabet input by the user; incorporate frequently used combinations of vowels, consonants, vowel-signs and half consonants into the forecast; and incorporate combinations of vowels, consonants, vowel-signs and half consonants based on the grammatical rules prescribed by the corresponding Indian language.

In accordance with the present disclosure, the computer readable instructions, when executed by the processor, are further configured to: process the alphabet(s) and the sequence thereof input by the user; compare the sequence input by the user with a pre-stored set of words; determine whether the sequence entered by the user is grammatically correct; search for at least one word from the pre-stored set of words that matches the sequence, and replace the sequence with the matched word, only in the event that the sequence was determined to be grammatically incorrect.

TECHNICAL ADVANTAGES

The technical advantages envisaged by the present disclosure include the realization of a keypad layout that caters exclusively to Indian Languages. The keypad layout seamlessly incorporates vowels, consonants, vowel-signs and half-consonants. The keypad is embedded with predictive capabilities and auto-correction capabilities, and is configured to predict the word(s) based on the character inputs provided by users. The keypad is customized for Indic languages. The keypad acts as a simple and easy to understand typing system for Indic languages. The key assignments of the keypad have been spatially grouped on the keyboard in accordance with the manner the vowels and consonants are formulated in respective Indian languages. The keypad provides for dynamic vowel-signs based prediction based on the character typed by the user. Further, the keypad provides for automatic correction of spelling/typing mistakes, along with providing for auto adjustment of words based on the underlying syntax and semantics.

What is claimed is:

1. A computer implemented system for creating a vowel-signs based keypad having predictive capabilities, said keypad configured to enable a user to input alphabets in at least an Indian language, said system comprising:

a user interface configured to display a keypad layout, said keypad layout comprising at least alphabets corresponding to a predetermined Indian language, said keypad layout comprising frequently used vowel-signs, and frequently used alphabets represented as selectable keys; and a processor cooperating with the user interface, said processor configured to:

process an Indian language alphabet input by the user, said processor further configured to trigger a display of corresponding Indian language vowel-signs, consonants and half consonants on the user interface, in an event the alphabet input by the user is a consonant;

process the alphabet input by the user, and trigger a display of words incorporating the alphabet input by the user;

further to triggering the display of said corresponding Indian language vowel-signs, consonants and half consonants on the user interface, in response to the alphabet input by the user being said consonant:

forecast a plurality of vowel-signs applicable to the consonant input by the user, and generate a list comprising said vowel-signs;

list said vowel-signs in a first decreasing order of priority, said first decreasing order of priority calculated based on a probability that each vowel-sign from said list can be successfully attached to the consonant input by the user;

selectively list said vowel-signs in a second decreasing order of priority, said second decreasing order of priority calculated based on a plurality of grammatical rules prescribed by said Indian language for attaching said consonant with each of said vowel-signs; and forecast a plurality of plausible words, subsequent to and based on said alphabet input by the user, and include frequently used combinations of vowels, consonants, vowel-signs and half consonants of said Indian language, as said plausible words, based on said forecast; and trigger said user interface to display said plurality of plausible words as suggestions to the user.

2. The system as claimed in claim 1, wherein said processor is further configured to, in response to the alphabet input by the user being said consonant, list said vowel-signs in a third decreasing order of priority, said third decreasing order of priority calculated based on a usage history corresponding to combinational use of said consonant with each of said vowel-signs included in said list.

3. The system as claimed in claim 1, wherein said processor is further configured to forecast said plurality of plausible words, subsequent to and based on said Indian language alphabet input by the user, said processor further configured to include combinations of corresponding Indian language vowels, consonants, vowel-signs and half consonants based on said plurality of grammatical rules prescribed by said Indian language.

4. The system as claimed in claim 1, wherein said processor is further configured to process an Indian language alphabetic sequence input by the user, said processor still further configured to compare the alphabetic sequence input by the user with a pre-stored set of words, said processor still further configured to determine whether the alphabetic sequence entered by the user is grammatically correct, said processor still further configured to search for at least one word from the pre-stored set of words that matches the alphabetic sequence, and replace said sequence with matched word, only in an event that the sequence is determined to be grammatically incorrect.

5. The system as claimed in claim 1, wherein said Indian language is selected from a group of Indian languages consisting of Hindi, Guajarati, Oriya, Punjabi, Bengali, Assamese, Telugu, Tamil, Kannada, Urdu and Malayalam.

6. The system as claimed in claim 5, wherein said keypad is further configured to enable said user to input the alphabets using at least one of an Arabic language, Persian language, Tifinagh script, Sinhalese language, Nepali language, Thai language and Hebrew language.

7. A computer implemented method for creating a vowel-signs based keypad having predictive capabilities, said method comprising the following computer implemented steps:
displaying a keypad layout on a user interface;
configuring said keypad layout to display at least alphabets corresponding to an Indian language, and frequently used vowel-signs, frequently used alphabets corresponding to said Indian language, as selectable keys on the keypad layout;
processing, by a processor, at least one Indian language alphabet input by the user;
in an event the user inputs a consonant:
triggering, by the processor, a display of vowel-signs, consonants and half consonants corresponding to said Indian language, on the user interface;
forecasting, by the processor, a plurality of vowel-signs applicable to the consonant input by the user, and generating a list comprising said vowel-signs, and further listing said vowel-signs in a first decreasing order of priority, said first decreasing order of priority calculated based on a probability that each vowel-sign from said list can be successfully attached to the consonant input by the user;
selectively listing said vowel-signs in a second decreasing order of priority, said second decreasing order of priority calculated based on a plurality of grammatical rules prescribed by said Indian language for attaching said consonant with each of said vowel-signs; and
processing, by the processor, the alphabet input by the user, and triggering a display of words that comprise at least the alphabet input by the user; and
forecasting, by the processor, a plurality of plausible words, subsequent to and based on said alphabet input by the user, and including frequently used combinations of vowels, consonants, vowel-signs and half consonants of said Indian language, as said plausible words, and further displaying said plurality of plausible words on the keypad layout as suggestions to the user; and
triggering, by said processor, said user interface to display said plurality of plausible words as suggestions to the user.

8. The method as claimed in claim 7, wherein the step of generating a list comprising said vowel-signs, further includes the step of calculating, by the processor, a third decreasing order of priority, said third decreasing order of priority calculated based on a usage history corresponding to combinational use of said consonant with each of said vowel-signs included in said list.

9. The method as claimed in claim 7, wherein the step of processing at least one Indian language alphabet input by the user, further includes the following steps:
forecasting, by said processor, said plurality of plausible words, subsequent to and based on said Indian language alphabet input by the user; and
incorporating combinations of corresponding Indian language vowels, consonants, vowel-signs and half consonants based on said plurality of grammatical rules prescribed by said Indian language, as said plausible words.

10. The method as claimed in claim 7, wherein the method further includes the following steps:
processing an Indian language alphabetic sequence input by the user;
comparing the alphabetic sequence input by the user with a pre-stored set of words;
determining whether the alphabetic sequence entered by the user is grammatically correct; and
searching for at least one word from the pre-stored set of words that matches the alphabetic sequence, and replacing said alphabetic sequence with the matched word, only in an event the alphabetic sequence is determined to be grammatically incorrect.

11. A non-transitory computer readable storage medium having computer readable instructions stored thereupon, said computer readable instructions, when executed by a processor, cause the processor to:
display a keypad layout on a user interface;
configure said keypad layout to display at least alphabets corresponding to an Indian language, and frequently used vowel-signs, frequently used alphabets corresponding to said Indian language, as selectable keys on the keypad layout;
process at least one Indian language alphabet input by the user, and in an event said at least one Indian language alphabet input by the user is a consonant:
trigger a display of vowel-signs, consonants and half consonants corresponding to said Indian language, on the user interface;
forecast a plurality of vowel-signs applicable to the consonant input by the user, and generate a list comprising said vowel-signs, and further list said vowel-signs in a first decreasing order of priority, said first decreasing order of priority calculated based on a probability that each vowel-sign from said list can be successfully attached to the consonant input by the user;
selectively list said vowel-signs in a second decreasing order of priority, said second decreasing order of priority calculated based on a plurality of grammatical rules prescribed by said Indian language for attaching said consonant with each of said vowel-signs; and calculating a third decreasing order of priority, said third decreasing order of priority calculated based on a usage history ef corresponding to combinational use of said consonant with each of said vowel-signs included in said list and selectively list said vowel-signs in said third decreasing order of priority process the alphabet input by the user, and trigger a display of words that comprise at least the alphabet input by the user;

forecast a plurality of plausible words, subsequent to and based on said alphabet input by the user, and include frequently used combinations of vowels, consonants, vowel-signs and half consonants of said Indian language, as said plausible words, and further display said plurality of plausible words on the keypad layout as suggestions to the user;

trigger said user interface to display said plurality of plausible words as suggestions to the user; and incorporate combinations of corresponding Indian language vowels, consonants, vowel-signs and half consonants based on said plurality of grammatical rules prescribed by said Indian language, as said plausible words.

12. The non-transitory computer readable storage medium as claimed in claim 11, wherein said computer readable instructions, when executed by the processor, further cause the processor to:

process an Indian language alphabetic sequence input by the user;

compare the alphabetic sequence input by the user with a pre-stored set of words;

determine whether the alphabetic sequence entered by the user is grammatically correct; and search for at least one word from the pre-stored set of words that matches the alphabetic sequence, and replace said alphabetic sequence with the matched word, only in an event the alphabetic sequence is determined to be grammatically incorrect.

* * * * *